US009632446B2

United States Patent
Matsuda et al.

(10) Patent No.: US 9,632,446 B2
(45) Date of Patent: Apr. 25, 2017

(54) CHARGING MEMBER, PROCESS CARTRIDGE, AND ELECTROPHOTOGRAPHIC IMAGE FORMING APPARATUS

(71) Applicant: CANON KABUSHIKI KAISHA, Tokyo (JP)

(72) Inventors: Hidekazu Matsuda, Susono (JP); Noboru Miyagawa, Suntou-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 156 days.

(21) Appl. No.: 14/293,884

(22) Filed: Jun. 2, 2014

(65) Prior Publication Data

US 2014/0274628 A1 Sep. 18, 2014

Related U.S. Application Data

(63) Continuation of application No. PCT/JP2013/007552, filed on Dec. 24, 2013.

(30) Foreign Application Priority Data

Dec. 27, 2012 (JP) ................................ 2012-285242

(51) Int. Cl.
*B32B 27/40* (2006.01)
*G03G 15/02* (2006.01)

(52) U.S. Cl.
CPC ..... *G03G 15/0233* (2013.01); *G03G 15/0208* (2013.01); *Y10T 428/31551* (2015.04)

(58) Field of Classification Search
CPC ........... G03G 15/0233; G03G 15/0208; Y10T 428/31551

(Continued)

(56) References Cited

U.S. PATENT DOCUMENTS 5,618,646 A * 4/1997 Nogami .................. C07C 59/52 430/58.45
7,067,608 B2 6/2006 Bender
(Continued)

FOREIGN PATENT DOCUMENTS

CN 1151536 6/1997
JP 3-9380 A 1/1991
(Continued)

OTHER PUBLICATIONS

International Preliminary Report on Patentability, International Application No. PCT/JP2013/007552, Mailing Date Jul. 9, 2015.

*Primary Examiner* — Harold Pyon
*Assistant Examiner* — Danny N Kang
(74) *Attorney, Agent, or Firm* — Fitzpatrick, Cella, Harper & Scinto

(57) ABSTRACT

A charging member is provided, suppressing the occurrence of streak-like images resulting from resistance increase caused by degradation of the charging member due to electric conduction for a long period. A process cartridge and an electrophotographic apparatus are also provided, suppressing the occurrence of streak-like images and stably forming a high-quality electrophotographic image.
The charging member comprises an electroconductive support and an electroconductive surface layer, the surface layer comprising at least one of the compounds respectively represented by formula (1), formula (3), and formula (4) defined in the specification, a binder resin, and a conducting agent. The process cartridge and the electrophotographic apparatus use the charging member.

5 Claims, 3 Drawing Sheets

(58) Field of Classification Search
USPC .......................................................... 252/500
See application file for complete search history.

(56) References Cited

U.S. PATENT DOCUMENTS

| | | | | |
|---|---|---|---|---|
| 7,544,158 | B2 | 6/2009 | Yamada et al. | |
| 2005/0154178 | A1* | 7/2005 | Bender .................. | C08G 65/40 528/80 |
| 2013/0252149 | A1* | 9/2013 | Nakamura ........... | G03G 5/0609 430/56 |
| 2014/0221183 | A1 | 8/2014 | Miyagawa et al. | |

FOREIGN PATENT DOCUMENTS

| | | | |
|---|---|---|---|
| JP | H03-101738 | | 4/1991 |
| JP | 7-295333 | A | 11/1995 |
| JP | 2003-173041 | A | 6/2003 |
| JP | 2009-91428 | A | 4/2009 |
| JP | 2011-132406 | A | 7/2011 |

* cited by examiner

CHARGING MEMBER, PROCESS CARTRIDGE, AND ELECTROPHOTOGRAPHIC IMAGE FORMING APPARATUS

CROSS-REFERENCE TO RELATED APPLICATIONS

This application is a continuation of International Application No. PCT/JP2013/007552, filed Dec. 24, 2013, which claims the benefit of Japanese Patent Application No. 2012-285242, filed Dec. 27, 2012.

BACKGROUND OF THE INVENTION

Field of the Invention

The present invention relates to a charging member, a process cartridge, and an electrophotographic image forming apparatus.

Description of the Related Art

In an image forming apparatus using an electrophotographic method, a charging member allows an electrophotographic photosensitive member (hereinafter also referred to as "photosensitive member") to be charged to a predetermined potential. The charging member usually includes an elastic body such as rubber or elastomer of which surface is provided with a surface layer of, for example, cross-linked urethane. A conducting agent is dispersed in the surface layer so as to impart conductivity.

Due to electric energy intermittently applied to the charging member in an electrophotographic image forming apparatus (hereinafter also referred to as "electrophotographic apparatus"), the electric resistance of the charging member gradually changes, causing uneven charging and charging defects, which result in image defects in some cases.

In Japanese Patent Application Laid-Open No. H03-9380, a technique for suppressing the occurrence of charging defects by addition of a hindered phenol material to the surface layer for suppression of deterioration of the surface layer material is disclosed.

SUMMARY OF THE INVENTION

As a result of investigation by the present inventors of the technique described in Japanese Patent Application Laid-Open No. H03-9380, however, it was found that the charging member by the technique in Japanese Patent Application Laid-Open No. H03-9380 still caused charging defects due to changes in electric resistance over time in some cases. The present inventors assume the following cause.

A high voltage is usually applied to the charging member in an electrophotographic apparatus, which discharges electricity to a photosensitive member to be charged, resulting in generation of discharge products such as ozone and nitrogen oxides including $NO_x$. In the case of antioxidizing agent of hindered phenol material as described in Japanese Patent Application Laid-Open No. H03-9380, the antioxidizing ability under the presence of $NO_x$ is inhibited by $NO_x$ in some cases. The reason is believed that the antioxidizing agent of hindered phenol material itself causes chemical reaction with $NO_x$, so as to form a stable quinone, losing the function as antioxidizing agent. In other words, the charging member by the technique of Japanese Patent Application Laid-Open No. H03-9380 has reduced antioxidizing ability of the hindered phenol compound due to generation of $NO_x$ during charging, resulting in changes in electric resistance over time. Consequently the charging evenness is impaired.

The present invention is, therefore, directed to providing a charging member of which the electric resistance hardly changes even in a long-term use so as to hardly cause image defects due to changes in electric resistance over time. The present invention is directed to providing a process cartridge and an electrophotographic apparatus, capable of stably forming a high-quality electrophotographic image.

The charging member of the present invention includes an electroconductive support and an electroconductive surface layer. The surface layer contains at least one compound selected from the group consisting of a compound represented by the following formula (1), a compound represented by the following formula (3), and a compound represented by the following formula (4), a binder resin, and a conducting agent.

(1)

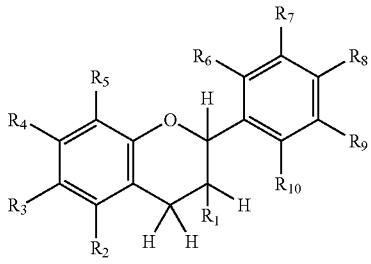

In the formula (1), $R_1$ represents a hydroxyl group or a substituent represented by the following formula (2), and $R_2$ to $R_{10}$ each independently represent a hydrogen atom or a hydroxyl group, wherein at least one of $R_1$ to $R_{10}$ is a hydroxyl group.

(2)

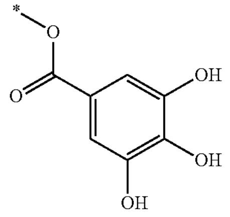

In the formula (2), * represents a bonding portion with the 3-position carbon atom of a compound represented by the formula (1).

(3)

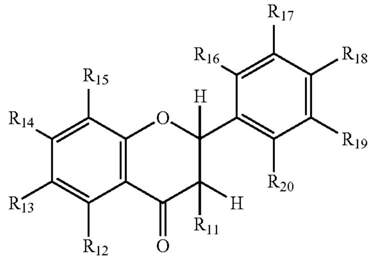

In the formula (3), $R_{11}$ to $R_{20}$ each independently represent an atom or a group selected from the group consisting of a hydrogen atom, a hydroxyl group, and a methoxy group, wherein at least one of $R_{11}$ to $R_{20}$ is a hydroxyl group.

(4)

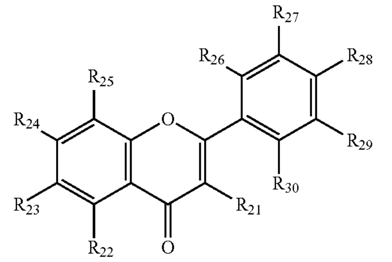

In the formula (4), $R_{21}$ to $R_{30}$ each independently represent an atom or a group selected from the group consisting of a hydrogen atom, a hydroxyl group, and a methoxy group, wherein at least one of $R_{21}$ to $R_{30}$ is a hydroxyl group.

The present invention also provides an electrophotographic image forming apparatus having an electrophotographic photosensitive member and a charging member arranged to charge the electrophotographic photosensitive member, wherein the charging member is the above-described charging member.

Furthermore, the present invention provides a process cartridge which integrally supports the charging member and at least one selected from the group consisting of an electrophotographic photosensitive member, a developing unit, a transferring unit, and a cleaning unit, and is detachably mountable to an electrophotographic image forming apparatus.

The present invention provides a charging member of which the electric resistance hardly changes even in a long-term use so as to hardly cause image defects due to changes in electric resistance over time. The present invention also provides a process cartridge and an electrophotographic apparatus, capable of stably forming a high-quality electrophotographic image.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

The present invention is described in more detail in the following.

<<Charging Member>>

The shape of a charging member of the present invention is not specifically limited, including, for example, a roller shape, a flat-plate shape, or a belt shape. Although the description is focused on the charging member in a roller shape (hereinafter also referred to as charging roller) in the following, the present invention is not limited thereto.

Figure 1:
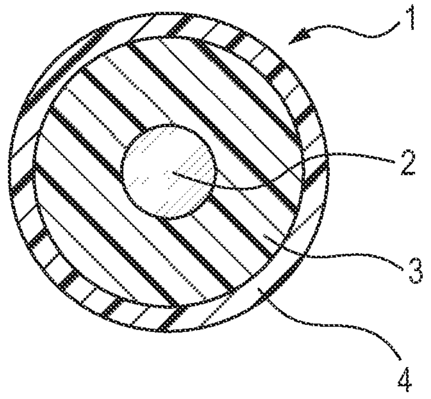
FIG. 1 is a schematic cross-sectional diagram, illustrating a charging member (in a roller shape) according to an example of the present invention.

The charging member of the present invention includes an electroconductive support and an electroconductive surface layer. A schematic cross-sectional diagram of a charging member according to an example of the present invention is illustrated in FIG. 1. The charging member 1 illustrated in FIG. 1 is a charging roller having an electroconductive support 2, an elastic layer 3 formed on the support, and an electroconductive surface layer 4 formed on the elastic layer. In the present invention, other layers (e.g. an elastic layer and an adhesion layer) may be arranged between the support and the surface layer formed on the support, as described above.

<Electroconductive Support>

As an electroconductive support (substrate) for use in the charging member of the present invention has conductivity (volume resistivity: $1\times10^{-6}$ Ω·cm to $1\times10^{2}$ Ω·cm) and function for supporting a layer such as surface layer to be arranged thereon. Examples of the material include a metal such as iron, copper, stainless steel, aluminum, and nickel and an alloy thereof.

<Electroconductive Surface Layer>

The electroconductive surface layer contains at least one compound selected from the group consisting of a compound represented by the following formula (1), a compound represented by the following formula (3), and a compound represented by the following formula (4), a binder resin, and a conducting agent.

(1)

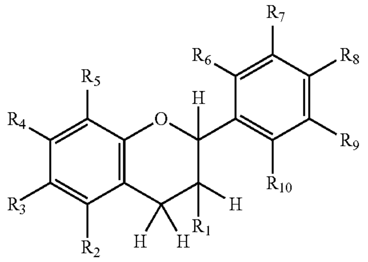

In the formula (1), $R_1$ represents a hydroxyl group or a substituent represented by the following formula (2), and $R_2$ to $R_{10}$ each independently represent a hydrogen atom or a hydroxyl group, wherein at least one of $R_1$ to $R_{10}$ is a hydroxyl group.

(2)

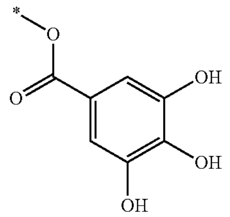

In the formula (2), * represents a bonding portion with the 3-position carbon atom of the compound represented by the formula (1).

(3)

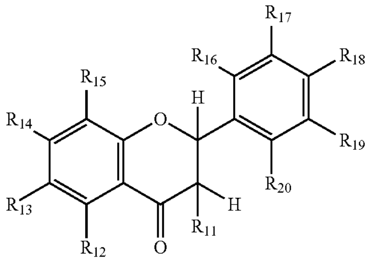

In the formula (3), $R_{11}$ to $R_{20}$ each independently represent an atom or a group selected from the group consisting of a hydrogen atom, a hydroxyl group, and a methoxy group, wherein at least one of $R_{11}$ to $R_{20}$ is a hydroxyl group.

(4)

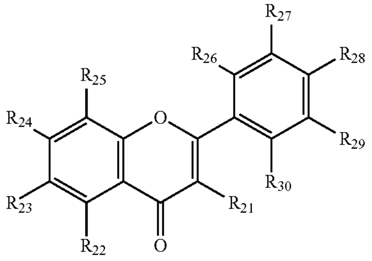

In the formula (4), $R_{21}$ to $R_{30}$ each independently represent an atom or a group selected from the group consisting of a hydrogen atom, a hydroxyl group, and a methoxy group, wherein at least one of $R_{21}$ to $R_{30}$ is a hydroxyl group.

The amount of the conducting agent contained in the surface layer compounded can be determined such that the surface layer has a middle range of resistance (volume resistivity: $1\times10^{6}$ Ω·cm to $1\times10^{15}$ Ω·cm under a low-temperature and low-humidity environment (L/L: 15° C./10% RH (relative humidity)), a normal-temperature and normal-humidity environment (N/N: 23° C./55% RH), and a high-temperature and high-humidity environment (H/H: 30° C./80% RH). The surface layer may further contain other additives to be described.

(Flavonoid)

The compounds represented by the formula (1), formula (3), and formula (4) are referred to as flavans, flavanones, and flovones, respectively, which belong to flavonoids as a kind of polyphenols originally widely distributed in nature as a plant constituent. These compounds include a benzene ring basic skeleton, which usually has a hydroxyl group. The hydroxyl group is referred to as phenolic hydroxyl group. Although many parts of the detailed reaction mechanism are unknown yet, it is assumed that the phenolic hydroxyl group supplies an electron or hydrogen atom to a radical molecule generated in a binder resin so as to form a phenoxy radical, which is eliminated through resonance structure stabilization or polymerization into a dimer, so that oxidative degradation of the material is prevented.

It is also assumed that the compounds have excellent radical elimination capability and antioxidative effect, since the structure derived from the basic skeleton itself other than the phenolic hydroxyl group imparts an electron or hydrogen atom to a radical generated in a binder resin.

Furthermore, being different from the antioxidizing agent of hindered phenol material, these compounds have strong antioxidative effect even under presence of nitrogen oxides as discharge products, so that free radicals formed from nitrogen oxides can be eliminated. In addition, being different from the antioxidizing agent of hindered phenol material, these compounds have no bulky alkyl group adjacent to a hydroxyl group, so that the reaction rate with radicals can be increased due to the small steric barrier. It is therefore assumed that the resistance increase of a charging member is efficiently suppressed, so that a high-quality image can be maintained for a long period. One kind of these compounds may be used singly or a plurality of kinds of the compounds may be used in combination.

Flavans (Also Including Flavanols)

Examples of the compound represented by the formula (1) include compounds described in Table 1.

(1)

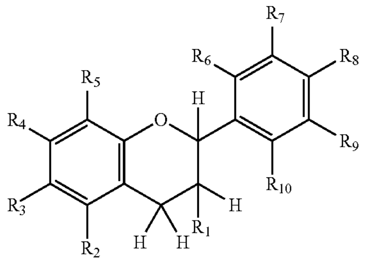

In the formula (1), $R_1$ represents a hydroxyl group or a substituent represented by the following formula (2), and $R_2$ to $R_{10}$ each independently represent a hydrogen atom or a hydroxyl group, wherein at least one of $R_1$ to $R_{10}$ is a hydroxyl group.

TABLE 1

| | $R_1$ | $R_2$ | $R_3$ | $R_4$ | $R_5$ | $R_6$ | $R_7$ | $R_8$ | $R_9$ | $R_{10}$ |
|---|---|---|---|---|---|---|---|---|---|---|
| Epicatechin | OH | OH | H | OH | H | H | H | OH | OH | H |
| Epicatechin gallate | Formula 2 | OH | H | OH | H | H | H | OH | OH | H |
| Epigallocatechin | OH | OH | H | OH | H | H | OH | OH | OH | H |
| Epigallocatechin gallate | Formula 2 | OH | H | OH | H | H | OH | OH | OH | H |
| Afzelechin | OH | OH | H | OH | H | H | H | OH | H | H |
| Flavanol | OH | H | H | H | H | H | H | H | H | H |

In Table 1, H represents a hydrogen atom, OH represents a hydroxyl group, and Formula 2 represents a substituent represented by the following formula (2).

(2)

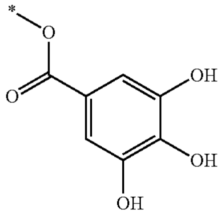

In the formula (2), * represents the bonding portion with the 3-position carbon atom of a compound represented by the formula (1). The 3-position carbon atom of a compound represented by the formula (1) is the carbon atom with which $R_1$ in the formula (1) is bonded. Among the compounds represented by the formula (1), epicatechin, epicatechin gallate, epigallocatechin, and epigallocatechin gallate can be used, having a large number of hydroxyl groups in a molecule and excellent radical trapping ability and being relatively easily available.

Flavanones (Also Including Flavanonols)

Examples of the compound represented by the formula (3) include compounds described in Table 2.

(3)

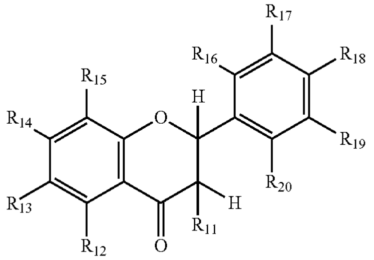

In the formula (3), $R_{11}$ to $R_{20}$ each independently represent an atom or a group selected from the group consisting of a hydrogen atom, a hydroxyl group, and a methoxy group, wherein at least one of $R_{11}$ to $R_{20}$ is a hydroxyl group.

TABLE 2

| | $R_{11}$ | $R_{12}$ | $R_{13}$ | $R_{14}$ | $R_{15}$ | $R_{16}$ | $R_{17}$ | $R_{18}$ | $R_{19}$ | $R_{20}$ |
|---|---|---|---|---|---|---|---|---|---|---|
| Alpinone | OH | OH | H | OMe | H | H | H | H | H | H |
| Eriodictyol | H | OH | H | OH | H | H | H | OH | OH | H |
| Sakuranetin | H | OH | H | OMe | H | H | H | OH | H | H |
| Citronetin | H | OH | H | OH | H | OMe | H | H | H | H |
| Taxifolin | OH | OH | H | OH | H | H | OH | OH | H | H |
| Naringenin | H | OH | H | OH | H | H | H | OH | H | H |
| Flavanonol | OH | H | H | H | H | H | H | H | H | H |
| Hesperetin | H | OH | H | OH | H | H | OH | OMe | H | H |
| Liquiritigenin | H | H | H | OH | H | H | H | OH | H | H |

In Table 2, H represents a hydrogen atom, OH represents a hydroxyl group, and OMe represents a methoxy group. Among the compounds represented by the formula (3), taxifolin can be used, having many number of hydroxyl groups in a molecule and excellent radical trapping ability.

Flavones (Also Including Flavonols)

Examples of the compound represented by the formula (4) include compounds described in Table 3.

(4)

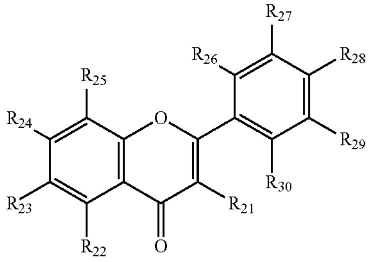

In the formula (4), $R_{21}$ to $R_{30}$ each independently represent an atom or a group selected from the group consisting of a hydrogen atom, a hydroxyl group, and a methoxy group, wherein at least one of $R_{21}$ to $R_{30}$ is a hydroxyl group.

TABLE 3

| | $R_{21}$ | $R_{22}$ | $R_{23}$ | $R_{24}$ | $R_{25}$ | $R_{26}$ | $R_{27}$ | $R_{28}$ | $R_{29}$ | $R_{30}$ |
|---|---|---|---|---|---|---|---|---|---|---|
| Acacetin | H | OH | H | OH | H | H | H | OMe | H | H |
| Apigenin | H | OH | H | OH | H | H | H | OH | H | H |

TABLE 3-continued

| | $R_{21}$ | $R_{22}$ | $R_{23}$ | $R_{24}$ | $R_{25}$ | $R_{26}$ | $R_{27}$ | $R_{28}$ | $R_{29}$ | $R_{30}$ |
|---|---|---|---|---|---|---|---|---|---|---|
| Isorhamnetin | OH | OH | H | OH | H | H | OMe | OH | H | H |
| Wogonin | H | OH | H | OH | OMe | H | H | H | H | H |
| Galangin | OH | OH | H | OH | H | H | H | H | H | H |
| Quercetagetin | OH | OH | OH | OH | H | H | OH | OH | H | H |
| Quercetin | OH | OH | H | OH | H | H | OH | OH | H | H |
| Chrysin | H | OH | H | OH | H | H | H | H | H | H |
| Kaempferol | OH | OH | H | OH | H | H | H | OH | H | H |
| Scutellarein | H | OH | OH | OH | H | H | H | OH | H | H |
| Tricine | H | OH | H | OH | H | H | OMe | OH | OMe | H |
| Baicalein | H | OH | OH | OH | H | H | H | H | H | H |
| Fisetin | OH | H | H | OH | H | H | OH | OH | H | H |
| Flavonol | OH | H | H | H | H | H | H | H | H | H |
| Pectolinarigenin | H | OH | OMe | OH | H | H | H | OMe | H | H |
| Myricetin | OH | OH | H | OH | H | H | OH | OH | OH | H |
| Morin | OH | OH | H | OH | H | OH | H | OH | H | H |
| Rhamnetin | OH | OH | H | OMe | H | H | OH | OH | H | H |
| Luteolin | H | OH | H | OH | H | H | OH | OH | H | H |
| Robinetin | OH | H | H | OH | H | H | OH | OH | OH | H |

In Table 3, H represents a hydrogen atom, OH represents a hydroxyl group, and OMe represents a methoxy group. Among the compounds represented by the formula (4), quercetagetin and myricetin can be used, having many number of hydroxyl groups in a molecule and excellent radical trapping ability.

(Amount of Flavonoids Compounded)

The total amount of the specific flavonoids (compounds represented by the formula (1), formula (3), and formula (4), respectively) added in the surface layer is preferably 0.01 parts by mass or more and 10 parts by mass or less, more preferably 0.05 parts by mass or more and 5 parts by mass or less relative to 100 parts by mass of the binder resin to be described below. With an amount added of 0.01 parts by mass or more, the effect of the present invention may be easily obtained. With an amount added of 10 parts by mass or less, reduction in strength of a binder resin may be easily prevented.

The total amount of these flavonoids in the surface layer can be 0.005 mass % or more in considering of the effect for suppressing degradation due to electric conduction, and can be 5 mass % or less in considering of the film formability of the surface layer and moldability.

In the case of using flavans, flavanones and flavones in combination, the compounding ratios thereof are properly set without specific limitations.

(Identification Method of Flavonoids)

Any structure of the compounds for use in the present invention represented by the formula (1), formula (3), and formula (4), respectively, can be identified by NMR.

(Binder Resin)

As the binder resin for use in the surface layer, a known binder resin in the field of electrophotographic apparatus such as a thermosetting resin and a thermoplastic resin may be used. More specifically, examples of the resin include a fluororesin, a polyamide resin, an acrylic resin, a polyurethane resin, an acrylic urethane resin, and a butyral resin.

These binder resins may be used singly, or two or more kinds of these may be mixed for use. The binder resin may be a homopolymer of one monomer or a copolymer of a plurality of monomers. Among these, a thermosetting resin can be used as the binder resin for use in the surface layer from the view point of high release properties without causing contamination of a photosensitive member or other members.

The specific flavonoid for use in the present invention is a compound having excellent antioxidizing ability, and the ability is expected to be shown not depending on the kind of binder resin to be added. These flavonoids tend to be rather hydrophilic, so that a binder resin to be added having relatively low polarity tends to have affinity with the flavonoid, compared to a resin having extremely high polarity. Consequently, urethane resins are preferred among binder resins, satisfying requisite characteristics for a charging member besides charging evenness. Among the urethane resins, an acrylic urethane resin is preferred in particular.

(Conducting Agent)

Examples of the conducting agent include an electron conducting agent and an ionic conducting agent.

Examples of the electron conducting agent include: metallic fine particles of such as aluminum, palladium, iron, copper, and silver; metal oxides such as titanium oxide, tin oxide, zinc oxide, and silicon oxide; the metal oxides and the above-described metallic fine particles doped with a substance such as a dissimilar metal or a dissimilar metal oxide; composite particles of metal oxide with surface treatment such as electrolysis, spraying, and mixing/shaking; and carbon particles (carbon black) such as furnace black, thermal black, acetylene black, ketjen black, PAN (polyacrylonitrile) based carbon, and pitch based carbon.

Examples of the furnace black include SAF-HS, SAF, ISAF-HS, ISAF, ISAF-LS, I-ISAF-HS, HAF-HS, HAF, HAF-LS, T-HS, T-NS, MAF, FEF, GPF, SRF-HS-HM, SRF-LM, ECF, and FEF-HS. Examples of the thermal black include FT and MT.

Examples of the ionic conducting agent include: an inorganic ionic material such as lithium perchlorate, sodium perchlorate, and calcium perchlorate; a cationic surfactant such as lauryl trimethylammonium chloride, stearyl trimethylammonium chloride, octadecyl trimethylammonium chloride, dodecyl trimethylammonium chloride, hexadecyl trimethylammonium chloride, trioctyl propylammonium bromide, and modified aliphatic dimethyl ethyl ammonium ethosulfate; a zwitterionic surfactant such as lauryl betaine, stearyl betaine, and dimethyl alkyl lauryl betaine; a quaternary ammonium salt such as tetraethyl ammonium perchlorate, tetrabutyl ammonium perchlorate, and trimethyl octadecyl ammonium perchlorate; and an organic lithium salt such as lithium trifluoromethanesulfonate.

These conducting agents may be used singly or in combinations of two or more kinds. The amount of the conducting agent added may be properly adjusted within the range allowing the desired electric resistance of a charging member to be obtained.

(Other Additives)

Other than the flavonoids, the binder resin, and the conducting agent, additives such as a filler made of inorganic compound may be added to the surface layer on an as needed basis.

<Elastic Layer>

In the present invention, an elastic layer may be arranged between the electroconductive support and the surface layer as described above.

The material for use in the elastic layer (material for forming the elastic layer) may include a polymer such as rubber and resin and various kinds of additives. Examples of the polymer include an epichlorohydrin rubber, an acrylonitrile-butadiene copolymer rubber (NBR), a chloroprene rubber, a urethane rubber, a silicone rubber, and a thermoplastic elastomer such as a styrene-butadiene-styrene (SBS) block copolymer and a styrene-ethylenebutylene-styrene (SEBS) block copolymer, any of which can be used. Among them, the use of polar rubber is more preferred, allowing for easy adjustment of resistance. Among the polar rubbers, the use of epichlorohydrin rubber or NBR is particularly preferred, having advantages allowing for more easy control of the resistance and hardness of an elastic layer. These polymers may be used singly or a plurality of kinds may be used in combination.

The polymer itself of epichlorohydrin rubber has a conductivity in the medium resistance range, capable of, for example, easily having excellent conductivity even with a small amount of conductive particles added. Furthermore, the epichlorohydrin rubber allows the variation of electric resistance in positional difference to be reduced, being suitable for use as a polymer elastic body. Examples of the epichlorohydrin rubber include an epichlorohydrin homopolymer, an epichlorohydrin-ethylene oxide copolymer, an epichlorohydrin-allyl glycidyl ether copolymer, and an epichlorohydrin-ethylene oxide-allyl glycidyl ether ternary copolymer. In particular, an epichlorohydrin-ethylene oxide-allyl glycidyl ether ternary copolymer can be used among them, having stable conductivity in the medium resistance range. The degree of polymerization and the composition ratio of the epichlorohydrin-ethylene oxide-allyl glycidyl ether ternary copolymer are arbitrarily adjusted, so that the conductivity and the workability may be easily controlled.

The elastic layer may include an epichlorohydrin rubber alone, or may include an epichlorohydrin rubber as main component (component having the highest content in the elastic layer) and other common rubbers and thermoplastic elastomers on an as needed basis. Examples of the other common rubbers include an ethylene propylene rubber (EPM), an ethylene-propylene-diene (EPDM) copolymer, NBR, a chloroprene rubber, a natural rubber, an isoprene rubber, a butadiene rubber, a styrene butadiene rubber, a urethane rubber, and a silicone rubber. Examples of the other thermoplastic elastomers include SBS and SEBS.

Other than the polymers, the elastic layer may also include additives such as a conducting agent (e.g. conductive particles), a plasticizer, an extender, a vulcanizing agent, a vulcanizing accelerator, an antiaging agent, and a foaming agent.

<Characteristics as Charging Member>

The charging member of the present invention can usually have an electric resistance of $1\times10^{2}\Omega$ or more and $1\times10^{10}\Omega$ or less under an environment at 23° C./50% RH (relative humidity), so as to achieve excellent charging of a photosensitive member.

Figure 5:
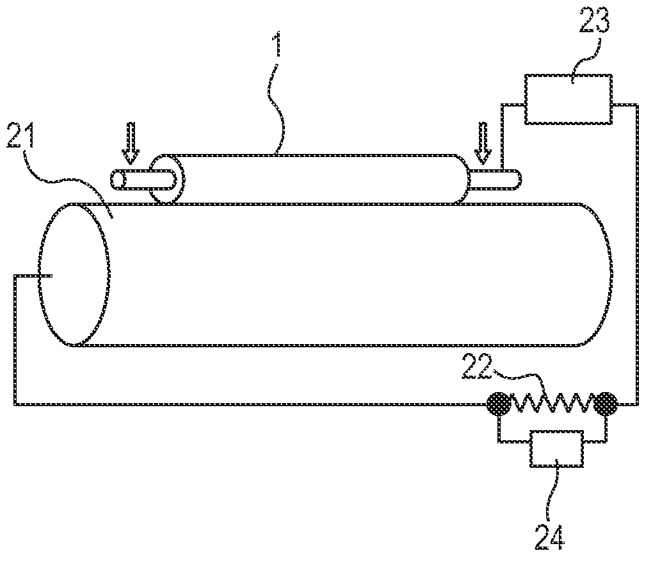
FIG. 5 is a diagram illustrating a measurement method of the electric resistance of a charging member (in a roller shape) of the present invention.

An example of the measurement method of the electric resistance of a charging member (the elastic layer and surface layer part, in particular) is illustrated in FIG. 5. A shaft bearing (not shown in drawing) allows the exposed parts of the electroconductive support at both ends of a charging roller 1 to be contacted in parallel with a cylindrical metal 21. The cylindrical metal 21 is rotated with a motor (not shown in drawing) in this state, and the contacting charging roller 1 is rotary driven, to which a DC voltage of −200 V is applied from a stabilized power source 23. On this occasion, the current flowing in a reference resistance 22 is measured with an ammeter 24, so as to calculate the resistance of the charging roller. On this occasion, the load applied to each of both ends of the charging roller 1 is set at 4.9 N for one end, and the rotation speed of the cylindrical metal 21 is set at a circumferential velocity of 45 mm/sec.

<<Manufacturing Method of Charging Member>>

A charging member of the present invention may be prepared by a manufacturing method including the step of applying a surface layer forming material which contains at least one of the compounds represented by the formula (1), formula (3), and formula (4), respectively, a binder resin, and a conducting agent onto an electroconductive support, for the formation of an electroconductive surface layer.

In the case of forming an elastic layer, the method may include, prior to the above-described step, the steps of: forming an elastic layer on the electroconductive support; and grinding the surface of the produced elastic layer.

<Elastic Layer Forming Step>

Firstly, a polymer and various additives are kneaded with a kneader so as to prepare a raw material rubber composition (elastic layer forming material). Examples of the kneader include a ribbon blender, a Nauta mixer, a Henschel mixer, a super mixer, a Bambury mixer, and a pressure kneader.

Figure 4:
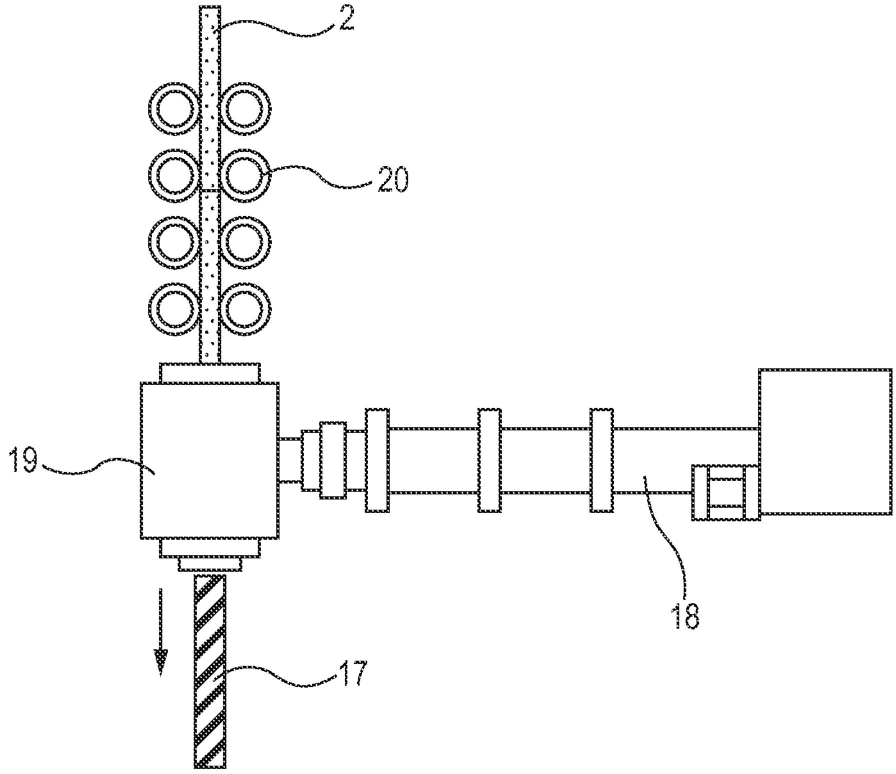
FIG. 4 is a diagram illustrating an extrusion forming device having a cross head for use in manufacturing a charging member of the present invention.

Subsequently, the raw material rubber composition is applied onto the electroconductive support (e.g. surface) so as to form an elastic layer. More specifically, the following method may be employed. For example, using an extrusion forming device having a cross head as illustrated in FIG. 4, an electroconductive support 2 applied with an adhesive is fed to a cross head 19 with an electroconductive support feeding roll 20. Meanwhile, the raw material rubber composition is extruded from an extruder 18, so that the electroconductive support as central shaft is coaxially coated with the raw material rubber composition in a cylindrical shape. The electroconductive support and the elastic layer forming material are thus integrally extruded to form the preformed body 17 of a charging member.

The cross head is a device commonly used for covering electrical cables and wires, being attached for use to a rubber discharge part of the cylinder of an extruder.

In an alternative method, a rubber tube made of the raw material rubber composition is formed, to which an electroconductive support coated with an adhesive is inserted in the tube to be bonded. In another alternative method, an electroconductive support coated with an adhesive is covered with an unvulcanized rubber sheet made of the raw material rubber composition so as to be vulcanized in a mold. As described above, the heating operation (vulcanizing operation) may be performed during formation of an elastic layer, according to the material for use in the raw material rubber composition.

<Grinding Step>

Subsequently, the surface of the produced elastic layer may be polished on an as needed basis. As a grinding device, a cylindrical grinding machine for forming a predetermined outer diameter may be used. Examples of the cylindrical grinding machine include a traverse-type NC cylindrical grinding machine and a plunge-cut type NC cylindrical grinding machine. A plunge-cut type NC cylindrical grinding machine is preferred, capable of reducing the processing time through use of a wider grinding stone compared to a traverse-type machine, with a smaller change in diameter of the grinding stone.

<Surface Layer Forming Step>

Subsequently, a coating liquid of the surface layer forming material is applied onto the produced elastic layer (onto the electroconductive support in the case of no elastic layer) so as to form the surface layer. Examples of the coating method include a vertical ring coating method, a dip coating method, an immersion coating method, a spray coating method, a roll coating method, a curtain coating method, and a gravure printing method. Among them, a vertical ring coating method and a dip coating method are most commonly used.

The charging member of the present invention is thus produced.

<<Electrophotographic Apparatus>>

Figure 2:
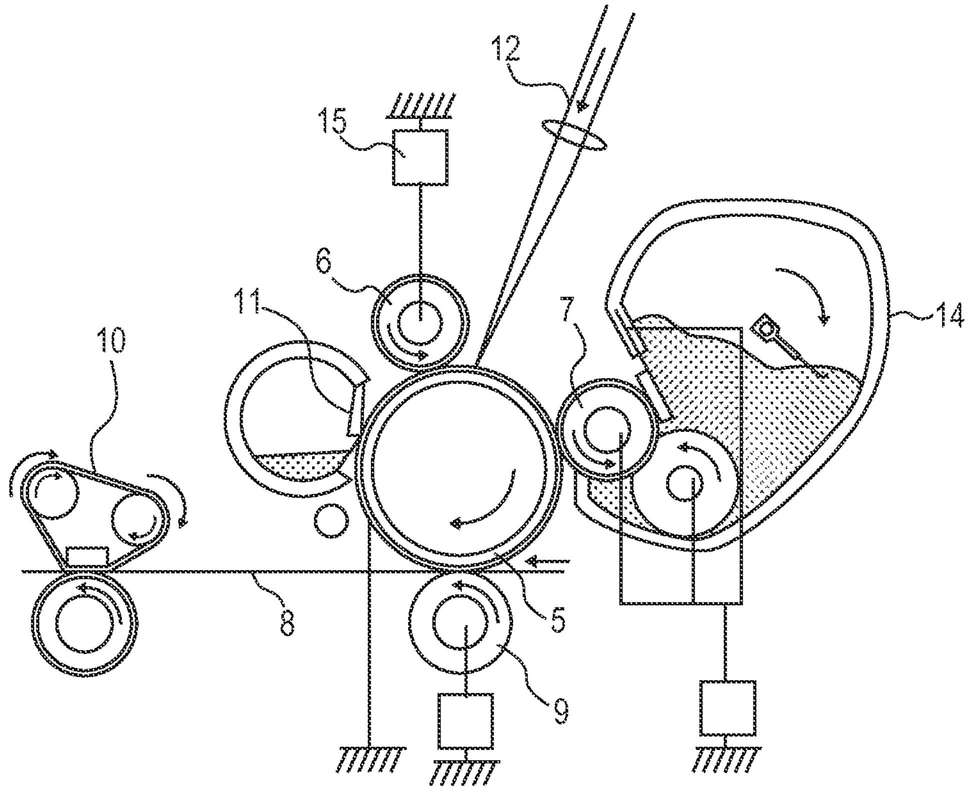
FIG. 2 is a schematic constitution diagram of an electrophotographic apparatus according to an example of the present invention.

The schematic constitution diagram of an electrophotographic image forming apparatus having the charging member of the present invention is illustrated in FIG. 2.

An electrophotographic photosensitive member 5 is a rotary drum type, having a photosensitive layer on a conductive substrate. The photosensitive member is rotary driven in the arrow direction at a predetermined circumferential velocity (process speed).

The charging device includes a contact type charging roller 6 to be arranged in contact with the photosensitive member 5 with a predetermined pressing force. A charging roller 6 is rotary-driven, following the rotation of the photosensitive member. The photosensitive member is chargeable to a predetermined potential by applying a predetermined DC voltage to the charging roller 6 from a power source for charging 15.

As a latent image forming device (not shown in drawing) for forming an electrostatic latent image on the photosensitive member 5, for example, an exposure device such as a laser beam scanner is used. The evenly charged photosensitive member is irradiated with exposure light 12 corresponding to the image information so as to form an electrostatic latent image.

A developing device 14 includes a developing roller 7 arranged adjacent to or in contact with the photosensitive member 5. The developing roller 7 allows the toner electrostatically treated in the same polarity as the charged polarity of the photosensitive member to form a toner image from the electrostatic latent image through reversal development.

A transferring roller 9 transfers the toner image from the photosensitive member to a transfer material 8 (the transfer material is conveyed by a paper supply system having a conveying member). A cleaning device including a blade-type cleaning member 11 and a collection container mechanically scrapes off the toner remaining after transferring on the photosensitive member for collection after transferring.

A fixing device 10 including a heated roll and the like fixes the transferred toner image on the transfer material 8, which is discharged outside the machine.

The electrophotographic apparatus of the present invention may also include, for example, the following process cartridge, exposure device, and fixing device.

<Process Cartridge>

Figure 3:
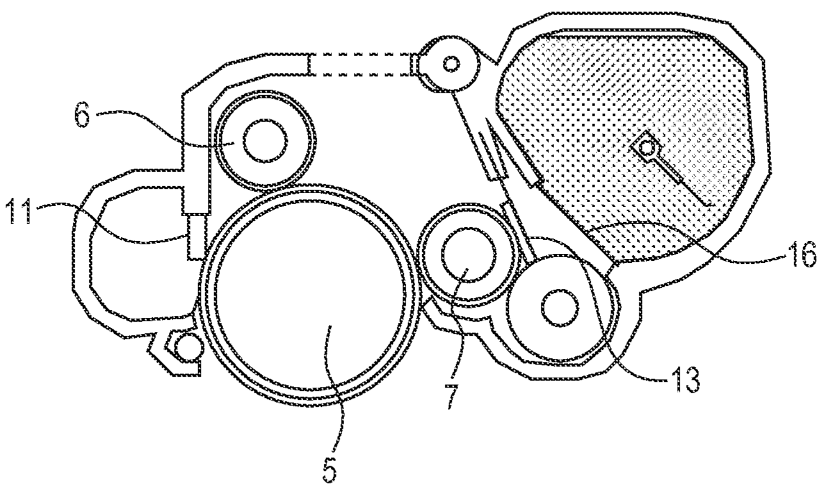
FIG. 3 is a schematic constitution diagram of a process cartridge according to an example of the present invention.

The electrophotographic apparatus of the present invention may also use a process cartridge of the present invention which integrates (integrally supports) the charging member and at least one selected from the group consisting of a electrophotographic photosensitive member, a developing device (developing unit), a transferring device (transferring unit), and a cleaning device (cleaning unit), being designed to be detachably mountable to the electrophotographic apparatus. An example of the process cartridge is illustrated in FIG. 3. In the process cartridge, the charging member (charging roller 6) is integrated with a member to be charged (photosensitive member 5) and detachably mountable to a main body of the electrophotographic apparatus. As the charging member, the charging member of the present invention is used. The reference signs 13 and 16 represent an elasticity restricting blade and a toner seal, respectively.

EXAMPLES

Example 1

Manufacturing of Elastic Roller

An elastic roller having an elastic layer on an electroconductive support was manufactured as follows.

To a stainless steel rod having a diameter of 6 mm and a length of 252.5 mm was coated with a thermosetting adhesive (trade name: METALOC U-20, made by Toyokagaku Kenkyusho Co., Ltd.), which was then dried for use as the electroconductive support.

In manufacturing a raw material rubber composition for the rubber elastic layer, the materials shown in the following Table 4 were kneaded for 15 minutes with a closed type mixer having a capacity of 6 litters, adjusted at 50° C. In Table 4, EO represents ethylene oxide, EP represents epichlorohydrin, and AGE represents allyl glycidyl ether.

TABLE 4

| Material | Parts by mass |
|---|---|
| Epichlorohydrin rubber (EO-EP-AGE ternary compound, EO/EP/AGE = 73 mol %/23 mol %/4 mol %) | 100.0 |
| Calcium carbonate | 60.0 |
| Aliphatic polyester based plasticizer (trade name: POLYCIZER P-202, made by DIC Corporation) | 10.0 |
| Zinc stearate | 1.0 |
| 2-Mercaptobenzimidazole | 0.5 |
| Zinc oxide | 2.0 |
| Quaternary ammonium salt (trade name: ADEKACIZER LV70; made by Adeka Corporation) | 2.0 |
| Carbon black (volume average particle diameter: 100 nm; volume resistivity: 0.1 Ω · cm) | 4.5 |

The materials described in the following Table 5 were added to the above, which were kneaded for 10 minutes with a two-roll mill cooled at 25° C. so as to prepare a raw material rubber composition.

TABLE 5

| Material | Parts by mass |
|---|---|
| Sulfur as vulcanizing agent | 1.2 |
| Dibenzothiazyl sulfide (DM) as vulcanizing accelerator | 1.0 |
| Tetramethylthiuram monosulfide (TS) as vulcanizing accelerator | 1.0 |

Subsequently, using an extrusion forming device having a cross head as illustrated in FIG. 4, a raw material rubber composition is coaxially applied in a cylindrical shape onto a electroconductive support as central shaft, so that the preformed body of a charging member having a raw material rubber composition layer with an outer diameter ϕ of 12.5 mm was produced.

Subsequently, the preformed body of a charging member was heated at 160° C. for 1 hour with an electric oven for vulcanization and curing of the adhesive. The raw material rubber composition layer at both ends of the electroconductive support was removed such that the raw material composition layer had a length of 228 mm in the axial direction of the support. The surface was then ground such that the roller had a shape with an outer diameter of 12 mm at the center. The elastic roller having an elastic layer on an electroconductive support was thus produced. The crown amount (difference in outer diameter at the center and at a position 90 mm away from the center) of the roller was 120 μm.

<Manufacturing of Surface Layer Coating Material (1)>

A surface layer coating material including an acrylic urethane resin as binder resin was prepared as follows.

Firstly, methyl isobutyl ketone was added to caprolactone modified acrylic polyol solution (trade name: "Placcel DC2016", made by Dicel Corporation), so as to adjust to have 14 mass % of solid content. To 720 parts by mass of the solution, the materials shown in the following Table 6 were added to prepare a mixed solution.

TABLE 6

| Material | Parts by mass |
|---|---|
| Carbon black (trade name: "#52", made by Mitsubishi Chemical Corporation) | 28.54 |
| Modified dimethyl silicone oil (*1) | 0.08 |
| Blocked isocyanate mixture (*2) | 80.78 |

(*1): modified dimethyl silicone oil (trade name: "SH28PA", made by Dow Corning Toray Co., Ltd.)
(*2): a 7:3 (mass ratio) mixture of the respective butanone oxime block products of hexamethylene diisocyanate (HDI) and isophorone diisocyanate (IPDI). The amount of isocyanate in the blocked isocyanate mixture was an amount of "NCO/OH = 1.0".

Subsequently, 200 g of the mixed solution and 200 g of glass beads as a dispersion medium having a central particle diameter of 0.6 mm to 0.85 mm (glass beads remained on a mesh having an aperture of 0.65 mm after screening with a mesh having an aperture of 0.85 mm and further screening with a mesh having an aperture of 0.65 mm) were placed in a glass bottle having a capacity of 450 mL, and dispersed for 48 hours with a paint shaker, so that a dispersion liquid was obtained.

Subsequently, 0.224 g of epigallocatechin gallate (1 parts by mass relative to 100 parts by mass of acrylic polyol solid content) was added to the dispersion liquid and further dispersed for 5 minutes.

The glass beads were then removed by filtration, so that the surface layer coating material (1) was obtained.

<Manufacturing of Charging Roller (1)>

The elastic roller was coated with the surface layer coating material (1) by one-time dipping. The coated roller was air-dried at normal temperature (23° C.) for 30 minutes or more, and further dried at 80° C. for 1 hour and 160° C. for 1 hour with a hot-air circulation dryer so as to produce a charging roller (1) having a surface layer on the elastic roller.

On this occasion, the dip coating was performed under the following conditions. The dipping time was 9 seconds. The pulling-up rate of the dip coat was changed linearly with time from an initial rate of 20 mm/s to an final rate of 2 mm/s.

Examples 2 to 5

Manufacturing of Charging Rollers (2) to (5)

Except that the amount of epigallocatechin gallate added for use in manufacturing the surface layer coating material (1) was changed as described in Table 8, charging rollers (2) to (5) were obtained by the same method as in Example 1.

Example 6

Manufacturing of Charging Roller (6)

Except that the surface layer coating material (1) was changed to the following surface layer coating material (2), a charging roller (6) was obtained by the same method as in Example 1.

<Manufacturing of Surface Layer Coating Material (2))>

A surface layer coating material including a nylon resin as binder resin was prepared as follows.

Firstly, 200 g of the mixed solution including the materials described in the following Table 7 and 200 g of glass beads as a dispersion medium having a central particle diameter of 0.6 mm to 0.85 mm (glass beads remained on a mesh having an aperture of 0.65 mm after screening with a mesh having an aperture of 0.85 mm and further screening with a mesh having an aperture of 0.65 mm) were placed in a glass bottle having a capacity of 450 mL, and dispersed for 24 hours with a paint shaker, so that a dispersion liquid was obtained.

TABLE 7

| Material | Parts by mass |
|---|---|
| N-methoxy methylated nylon | 100 |
| Carbon black (trade name: "#52", made by Mitsubishi Chemical Corporation) | 45 |
| Methanol | 256 |
| Toluene | 135 |
| Citric acid | 2 |

Subsequently, 0.19 g of epigallocatechin gallate (0.5 parts by mass relative to 100 parts by mass of methoxy methylated nylon solid content) was added to the dispersion liquid and further dispersed for 5 minutes. The glass beads were then removed by filtration, so that the surface layer coating material (2) was obtained.

Examples 7 to 21

Manufacturing of Charging Rollers (7) to (21)

Except that epigallocatechin gallate for use in manufacturing the surface layer coating material (1) was changed to a compound (flavonoid) described in Table 8 with an amount added described in Table 8, charging rollers (7) to (21) were obtained by the same method as in Example 1.

Comparative Example 1

Manufacturing of Charging Roller (22)

Except that epigallocatechin gallate for use in manufacturing the surface layer coating material (1) was changed to a hindered phenol based antioxidizing agent (trade name: "IRGANOX 1010", made by Toyotsu Chemiplas Corporation) with an amount added of 0.5 parts by mass, a charging roller (22) was obtained by the same method as in Example 1.

Comparative Example 2

Manufacturing of Charging Roller (23)

Except that no epigallocatechin gallate was added to the surface layer coating material (1), a charging roller (23) was obtained by the same method as in Example 1.

<Evaluation Method of Charging Roller>

<Evaluation of Streak-Like Image>

For use as the electrophotographic apparatus having a configuration as illustrated in FIG. 2, a color laser jet printer made by Hewlett-Packard Development Company (trade name: HP COLOR LASERJET 4700DN) was modified to have a recording medium output speed of 200 mm/sec (A4 vertical output). The image resolution was 600 dpi, and the output DC voltage of primary charging was −1,100 V.

As the process cartridge having the configuration illustrated in FIG. 3, the process cartridge (for black) for the printer was used. The charging roller produced in each of the examples was mounted to the process cartridge.

Subsequently, a durability test was performed under a high-temperature and high-humidity environment (30° C./80% RH). In the durability test conditions, 15,000 (15 k) sheets of paper were intermittently fed through (3-second halt after feeding 2 sheets through) with a print coverage rate of 2%. A half tone image (image drawn by horizontal lines having a width of 1 dot and a space of 2 dots in the direction vertical to the rotation direction of the photosensitive member) was then outputted for the evaluation of the streak-like image existing on the halftone image according to the following criteria:

Rank A: a level at which no streak-like image occurs;

Rank B: a level at which only slightly streak-like images occur so as to be hardly recognized;

Rank C: a level at which streak-like images are partially recognized, causing no practical problem; and Rank D: a level at which streak-like images occur over the whole area, seriously reducing the image quality.

The electric resistance of the charging roller was also measured in the early phase (prior to the durability test) and after the 15 k durability test. On this occasion, the electric resistance was measured with the device illustrated in FIG. 5. More specifically, a shaft bearing (not shown in drawing) allowed the exposed parts of the electroconductive support at both ends of a charging roller to be contacted in parallel with a cylindrical metal 21. The cylindrical metal 21 was rotated with a motor (not shown in drawing) in this state, and the contacting charging roller was rotary driven, to which a DC voltage of −200 V was applied from a stabilized power source 23. On this occasion, the current flowing in a reference resistance 22 was measured with an ammeter 24, so as to calculate the resistance of the charging roller. On this occasion, the load applied to each of both ends of the charging roller was set at 4.9 N for one end, and the rotation speed of the cylindrical metal was set at a circumferential velocity of 45 mm/sec.

The evaluation results for the respective charging rollers obtained in Examples 1 to 21 and Comparative Examples 1 and 2 are described in Table 8.

In Comparative Examples 1 and 2, the change in electric resistance of the charging roller was large between before and after the durability test, so that the charging ability was not sufficiently maintained. From the results, it is indicated that the charging roller added with a hindered phenol based antioxidizing agent maintains no charging ability under presence of nitrogen oxides as discharge products due to deactivation of the radical trapping ability.

On the other hand, in Examples 1 to 21, the change in electric resistance of the charging roller was small between before and after the durability test compared to the results in Comparative Examples. It was therefore confirmed that the charging ability can be maintained by addition of a specific flavonoid to the surface layer.

TABLE 8

| | | Charging roller No. | Flavonoid and other compounds | Amount added (*a) (Parts by mass) | Amount compounded (*b) (Parts by mass) | Binder resin | Streak-like image Evaluation | Electric resistance (kΩ) Initial phase | Electric resistance (kΩ) After 15k durability test |
|---|---|---|---|---|---|---|---|---|---|
| Example | 1 | 1 | Epigallocatechin gallate | 1 | 0.63 | Acrylic urethane | A | 80 | 83 |
| | 2 | 2 | Epigallocatechin gallate | 0.5 | 0.316 | Acrylic urethane | A | 78 | 82 |
| | 3 | 3 | Epigallocatechin gallate | 0.3 | 0.19 | Acrylic urethane | A | 82 | 87 |
| | 4 | 4 | Epigallocatechin gallate | 0.1 | 0.063 | Acrylic urethane | A | 69 | 75 |
| | 5 | 5 | Epigallocatechin gallate | 0.05 | 0.0317 | Acrylic urethane | A | 73 | 79 |
| | 6 | 6 | Epigallocatechin gallate | 0.5 | 0.5 | Nylon | A | 78 | 84 |
| | 7 | 7 | Epicatechin gallate | 0.3 | 0.19 | Acrylic urethane | A | 75 | 80 |
| | 8 | 8 | Epigallocatechin | 0.5 | 0.316 | Acrylic urethane | A | 78 | 83 |
| | 9 | 9 | Epicatechin | 0.8 | 0.505 | Acrylic urethane | A | 83 | 89 |
| | 10 | 10 | Quercetagetin | 0.5 | 0.316 | Acrylic urethane | A | 77 | 82 |
| | 11 | 11 | Myricetin | 0.5 | 0.316 | Acrylic urethane | A | 80 | 85 |
| | 12 | 12 | Taxifolin | 0.3 | 0.19 | Acrylic urethane | A | 77 | 86 |
| | 13 | 13 | Quercetin | 0.7 | 0.442 | Acrylic urethane | A | 74 | 81 |
| | 14 | 14 | Afzelechin | 0.6 | 0.379 | Acrylic urethane | B | 80 | 98 |
| | 15 | 15 | Kaempferol | 0.4 | 0.253 | Acrylic urethane | B | 76 | 94 |
| | 16 | 16 | Naringenin | 0.8 | 0.505 | Acrylic urethane | B | 74 | 91 |
| | 17 | 17 | Apigenin | 0.2 | 0.127 | Acrylic urethane | B | 75 | 93 |
| | 18 | 18 | Citronetin | 0.25 | 0.158 | Acrylic urethane | C | 77 | 107 |

TABLE 8-continued

| | | Charging roller No. | Flavonoid and other compounds | Amount added (*a) (Parts by mass) | Amount compounded (*b) (Parts by mass) | Binder resin | Streak-like image Evaluation | Electric resistance (kΩ) Initial phase | Electric resistance (kΩ) After 15k durability test |
|---|---|---|---|---|---|---|---|---|---|
| | 19 | 19 | Wogonin | 0.75 | 0.473 | Acrylic urethane | C | 76 | 105 |
| | 20 | 20 | Flavanonol | 0.5 | 0.316 | Acrylic urethane | C | 74 | 108 |
| | 21 | 21 | Flavonol | 0.5 | 0.316 | Acrylic urethane | C | 77 | 111 |
| Comparative | 1 | 22 | Hindered phenol | 0.5 | 0.316 | Acrylic urethane | D | 78 | 196 |
| Example | 2 | 23 | None | — | — | Acrylic urethane | D | 80 | 223 |

(*a): Amount of flavonoid and other compounds added relative to 100 parts by mass of solid content of caprolactone modified acrylic polyol or N-methoxy methylated nylon.
(*b): Amount of flavonoid and other compounds compounded relative to 100 parts by mass of binder resin.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-285242, filed Dec. 27, 2012, which is hereby incorporated by reference herein in its entirety.

REFERENCE SIGNS LIST

1, 6: CHARGING MEMBER(CHARGING ROLLER)
2: ELECTROCONDUCTIVE SUPPORT
3: ELASTIC LAYER
4: ELECTROCONDUCTIVE SURFACE LAYER
5: ELECTROPHOTOGRAPHIC PHOTOSENSITIVE MEMBER PHOTOSENSITIVE MEMBER)
7: DEVELOPING ROLLER
8: TRANSFER MATERIAL
9: TRANSFERRING ROLLER
10: FIXING DEVICE
11: CLEANING MEMBER
12: EXPOSURE LIGHT
13: ELASTICITY RESTRICTING BLADE
14: DEVELOPING DEVICE
15: POWER SOURCE
16: TONER SEAL
17: PREFORMED BODY OF CHARGING MEMBER
18: EXTRUDER
19: CROSS HEAD
20: ELECTROCONDUCTIVE SUPPORT FEEDING ROLL
21: CYLINDRICAL METAL
22: REFERENCE RESISTANCE
23: STABILIZED POWER SOURCE
24: AMMETER

What is claimed is:

1. A charging member comprising an electroconductive support and an electroconductive surface layer, the electroconductive surface layer comprising: at least one compound selected from the group consisting of a compound represented by formulae (1) and (3); a binder resin; and a conducting agent:

formula (1)

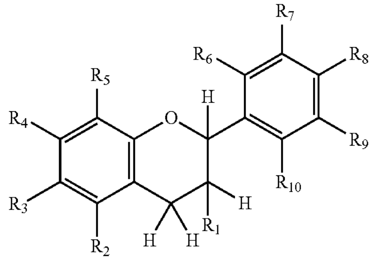

wherein $R_1$ represents a substituent represented by the following formula (2), and $R_2$ to $R_{10}$ each independently represent a hydrogen atom or a hydroxyl group, wherein at least one of $R_1$ to $R_{10}$ is a hydroxyl group;

(formula 2)

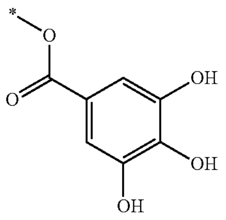

wherein "*" represents a bonding portion with the 3-position carbon atom of the compound represented by the formula (1);

(formula 3)

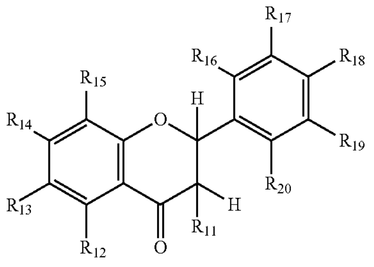

wherein $R_{11}$ to $R_{20}$ each independently represent an atom or a group selected from the group consisting of a hydrogen atom, a hydroxyl group, and a methoxy group, wherein at least one of $R_{11}$ to $R_{20}$ is a hydroxyl group.

2. The charging member according to claim 1, wherein the surface layer comprises a compound represented by the formula (1), the compound represented by the formula (1) being selected from the group consisting of formulae (7) and (8):

(formula 7)

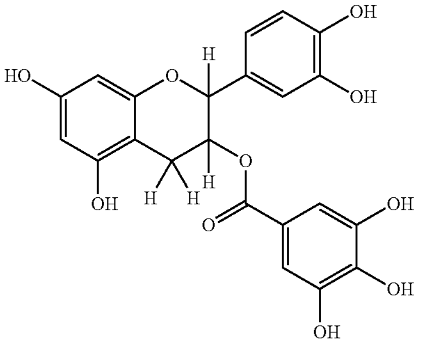

-continued (formula 8)

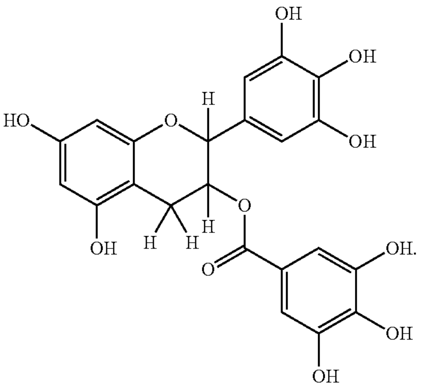

3. The charging member according to claim 1, wherein the binder resin is an acrylic urethane resin.

4. An electrophotographic image forming apparatus comprising an electrophotographic photosensitive member and a charging member according to claim 1 arranged for charging the electrophotographic photosensitive member.

5. A process cartridge, integrally supporting a charging member according to claim 1 and at least one selected from the group consisting of an electrophotographic photosensitive member, a developing unit, a transferring unit, and a cleaning unit, and being detachably mountable to an electrophotographic image forming apparatus.

* * * * *